(12) United States Patent
Jung et al.

(10) Patent No.: US 9,982,121 B2
(45) Date of Patent: May 29, 2018

(54) PYRIDINIUM MODIFIED COMPOSITE, AND ARTICLE INCLUDING SAME

(71) Applicant: SAMSUNG ELECTRONICS CO., LTD., Suwon-si, Gyeonggi-do (KR)

(72) Inventors: Won Cheol Jung, Seoul (KR); In Ki Kim, Hwaseong-si (KR); Moo Ho Lee, Suwon-si (KR); Ginam Kim, Seongnam-si (KR); In Kim, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 4 days.

(21) Appl. No.: 15/357,166

(22) Filed: Nov. 21, 2016

(65) Prior Publication Data

US 2018/0009974 A1  Jan. 11, 2018

(30) Foreign Application Priority Data

Jul. 11, 2016  (KR) .......................... 10-2016-0087402

(51) Int. Cl.
*C08L 23/12*  (2006.01)
*C08L 39/08*  (2006.01)

(52) U.S. Cl.
CPC .............. *C08L 23/12* (2013.01); *C08L 39/08* (2013.01)

(58) Field of Classification Search
CPC .................................. C08L 39/08; C08L 23/12
See application file for complete search history.

(56) References Cited

U.S. PATENT DOCUMENTS

| | | | | |
|---|---|---|---|---|
| 3,607,815 | A * | 9/1971 | Patton .................. | C08K 5/0016 264/78 |
| 4,665,115 | A * | 5/1987 | Lundberg et al. ... | C10M 159/18 508/264 |
| 7,943,157 | B2 | 5/2011 | Loffler et al. | |
| 8,062,630 | B2 | 11/2011 | Loffler et al. | |
| 8,187,581 | B2 | 5/2012 | Loffler et al. | |
| 8,343,473 | B2 | 1/2013 | Youngblood et al. | |
| 2009/0018276 | A1* | 1/2009 | Boudjouk et al. .... | C08F 283/12 525/418 |
| 2014/0080977 | A1 | 3/2014 | Youngblood et al. | |
| 2015/0166796 | A1 | 6/2015 | Sun et al. | |

FOREIGN PATENT DOCUMENTS

| | | |
|---|---|---|
| CN | 105155269 A | 12/2015 |
| EP | 1739143 A1 | 1/2007 |
| EP | 1972437 A1 | 9/2008 |
| WO | 0244229 A1 | 6/2002 |
| WO | 2006070376 A1 | 7/2006 |
| WO | 2007147094 A2 | 12/2007 |
| WO | 2009027971 A2 | 3/2009 |
| WO | 2009032406 A1 | 3/2009 |
| WO | 2014155156 A1 | 10/2014 |

OTHER PUBLICATIONS

Franck Hui, et al., "Antimicrobial N-Halamine Polymers and Coatings: A Review of Their Synthesis, Characterization, and Applications", Biomacromolecules 2013, vol. 14, 585-601.
Rami F. El-Hayek, et al., "Bacteriostatic polymer film immobilization", Journal of Biomedical Materials Research vol. 79, Part A, 874-881, 2006.
Tao Lin Sun, et al., "Physical hydrogels composed of polyampholytes demonstrate high toughness and viscoelasticity", Nature Materials, vol. 12, 2013, 932-37.
Tatsuo Tashiro, "Removal of Bacteria from Water by Systems Based on Insoluble Polystyrene-Polystyrene-Polyethyelnimine", Journal of Applied Polymer Science, vol. 46, 899-907 (1992).
Extended Euorpean Search Report dated Oct. 20, 2017, of the corresponding European Patent Application No. 171771504.

* cited by examiner

*Primary Examiner* — Nathan M Nutter
(74) *Attorney, Agent, or Firm* — Cantor Colburn LLP

(57) ABSTRACT

A composite includes a cross-linked polymer including a pyridinium group and a thermoplastic polymer, and an article that includes the composite.

20 Claims, 3 Drawing Sheets

PYRIDINIUM MODIFIED COMPOSITE, AND ARTICLE INCLUDING SAME

CROSS-REFERENCE TO RELATED APPLICATION

This application claims priority to and the benefit of Korean Patent Application No. 10-2016-0087402 filed in the Korean Intellectual Property Office on Jul. 11, 2016, and all of the benefits accruing therefrom under 35 U.S.C. §119, the content of which is incorporated herein in its entirety by reference.

BACKGROUND

1. Field

A pyridinium modified composite and an article including the same are disclosed.

2. Description of the Related Art

The interior and exterior parts of home appliances such as a washing tub of a washer, a liner of a refrigerator, a heat exchanger of an air conditioner, and the like, are operated under a wet condition and desirably include a material having antibiotic, antifungal, and antifouling functionality. In addition to the home appliances, medical appliances, such as a bio sensor, a food storage container, a water purification system, base materials for a vessel, and the like, also benefit from technology that regulates fouling and biofouling.

A conventional antifouling technology representatively includes the addition of an inorganic compound such as antibiotic silver and the like to a polymer substrate. This antibiotic additive of the polymer leaches an antibacterial agent and thus provides the antibiotic characteristics, but may harm a human body on contact due to the leached antibacterial agent, gradually decreases in its amount, and has a drawback of undesirable long-term durability against deterioration.

The antifouling functionality may be realized by adding and/or coating a non-leaching material, such as a polymer including N-halamine and the like, but this technology has a drawback of needing repetitive input of a halogen raw material for regeneration of the antifouling functionality.

In addition, the conventional antibiotic and antifouling technology is applied by coating the surface of an extruded or injection-molded article with an antibiotic material. The coating technology may realize antibiotic and antifouling functionality at low concentrations, and thus is widely used. However, the coating technology has the problems of requiring a separate coating process, and the coating can peel-off over time. Thus, this coating technology is inappropriate for realizing long-term durability and economically feasible production of the interior and exterior parts of home appliances and the like.

Accordingly, there is a need to develop novel materials capable of being extruded and/or injection-molded, that do not leach an antibiotic or antifouling component, that have excellent antibiotic and antifouling performance, and that are durable for greater than or equal to about 10 years.

SUMMARY

An embodiment provides an antibiotic, antifungal, and antifouling composite that is capable of providing long-term antibiotic, antifungal, and antifouling functionality, does not leach an antibiotic and/or antifouling component, is not consumed with use, has excellent durability, and is directly applicable to an extrusion and injection-molding process.

Another embodiment provides an article having long-term antibiotic, antifungal, and antifouling functionality without a separate coating.

An embodiment provides a composite including a cross-linked polymer including a pyridinium group and a thermoplastic polymer.

The cross-linked polymer including a pyridinium group may be derived from a compound including a pyridinium group and a multi-functional compound including at least two curable functional groups.

The compound including a pyridinium group may be represented by Chemical Formula 1.

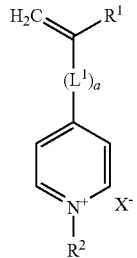

Chemical Formula 1

In Chemical Formula 1, $R^1$ is a hydrogen atom or a methyl group, $L^1$ is a substituted or unsubstituted C1 to C10 alkylene group, a substituted or unsubstituted C3 to C20 cycloalkylene group, a substituted or unsubstituted C6 to C20 arylene group, a substituted or unsubstituted C3 to C20 aliphatic or aromatic heterocyclic group, —C(=O)—, —C(=O)O—, —O—, or —C(=O)NH—, a is an integer of 0 to 3, $R^2$ is a substituted or unsubstituted C1 to C30 alkyl group, a substituted or unsubstituted C3 to C30 cycloalkyl group, a substituted or unsubstituted C6 to C30 aryl group, or a substituted or unsubstituted C3 to C30 aliphatic or aromatic heterocyclic group, and $X^-$ is a halide ion, a hydroxide ion, a nitrate ion, a phosphate salt ion, a trifluoroacetate salt, or a sulfate ion.

The $R^2$ of Chemical Formula 1 may be a C6 to C30 alkyl group.

The multi-functional compound including at least two curable functional groups may be selected from ethylene glycol di(meth)acrylate, propylene glycol di(meth)acrylate, polyethylene glycol di(meth)acrylate, polypropylene glycol di(meth)acrylate, butanediol di(meth)acrylate, hexamethylene glycol di(meth)acrylate, trimethylolpropane tri(meth)acrylate, glycerine tri(meth)acrylate, pentaerythritol tetra(meth)acrylate, diglycerine hexa(meth)acrylate, bisphenol A diglycidyl ether, bisphenol F diglycidyl ether, hexahydrophthalic acid glycidyl ester, diphenylmethane diisocyanate, 1,6-hexamethylene diisocyanate, 2,2,4-trimethylhexamethylene diisocyanate, phenylene diisocyanate, 4,4'-dicyclohexylmethane diisocyanate, 3,3'-dimethyldiphenyl-4,4'-diisocyanate, xylene diisocyanate, naphthalene diisocyanate, 1,4-cyclohexyl diisocyanate, and a combination thereof.

The pyridinium group may be included in an amount of about 50 weight percent to about 99.9 weight percent based on the total weight of the cross-linked polymer including a pyridinium group.

A weight average molecular weight of the cross-linked polymer including a pyridinium group may be about 1,000 grams per mole to about 10,000,000 grams per mole.

The cross-linked polymer including a pyridinium group may be included in an amount of about 0.1 weight percent to about 50 weight percent based on the total weight of the composite.

The thermoplastic polymer may be selected from a polyolefin, a polyalkyl(meth)acrylate, a polyacrylonitrile, a polystyrene, a polyvinyl chloride, a polyvinylidene chloride, a silicone polymer, a polysulfone, a polycarbonate, a rubber modified vinyl copolymer, a polyamide, a polyester, a polyurethane, a copolymer thereof, and a combination thereof.

The thermoplastic polymer may be included in an amount of about 50 weight percent to about 99.9 weight percent based on the total weight of the composite.

Another embodiment provides an article including the composite.

The article may be manufactured by extruding or injecting the composite.

The article may have an antibacterial activity that is greater than or equal to about 99% against each of *Escherichia coli* and *staphylococcus* when measured according to an ISO 22196 test standard.

The article may have an antibacterial activity that is greater than or equal to about 90% against each of *Escherichia coli* and *staphylococcus* when measured according to an ISO 22196 test standard after the article is twice dipped in water at 90° C. for about 16 hours.

The article may have an amount of fouling that is reduced by greater than or equal to about 30% compared with an amount of fouling of an article without the cross-linked polymer including a pyridinium group.

The article may have an antifungal level that is 0 when measured according to an ISO 846 test standard.

The article may also have an antifungal level of 0 when measured according to an ISO 846 test standard after being dipped in 90° C. water for about 16 hours.

Another embodiment provides a method of preparing the composite, including combining a cross-linked polymer comprising a pyridinium group and a thermoplastic polymer.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
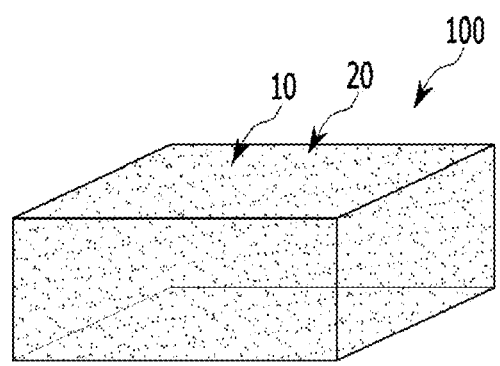
FIG. 1 is a schematic view showing a composite according to an embodiment.

Advantages and characteristics of this disclosure, and a method for achieving the same, will become evident referring to the following example embodiments together with the drawings attached hereto. If not defined otherwise, all terms (including technical and scientific terms) in the specification may be defined as commonly understood by one skilled in the art. The terms defined in a generally-used dictionary may not be interpreted ideally or exaggeratedly unless clearly defined. In addition, unless explicitly described to the contrary, the word "comprise" and variations such as "comprises" or "comprising," will be understood to imply the inclusion of stated elements but not the exclusion of any other elements.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer, or section. Thus, "a first element," "component," "region," "layer," or "section" discussed below could be termed a second element, component, region, layer, or section without departing from the teachings herein.

The terminology used herein is for describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, or 5% of the stated value.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, as used herein, when a definition is not otherwise provided, the term "substituted" refers to a group or compound wherein at least one of the hydrogen atoms thereof is substituted with a 01 to C30 alkyl group, a C2 to C30 alkenyl or alkynyl group, a C6 to C30 aryl group, a C7 to C30 alkylaryl group, a 01 to C30 alkoxy group, a 01 to C30 heteroalkyl group, a C3 to C30 heteroalkylaryl group, a C3 to C30 cycloalkyl group, a C3 to C15 cycloalkenyl group, a C6 to C30 cycloalkynyl group, a C2 to C30 heterocycloalkyl group, a halogen (F, Cl, Br, or I), a hydroxy group (—OH), a nitro group (—$NO_2$), a cyano group (—CN), an amino group (—NRR' wherein R and R' are independently hydrogen or a C1 to C6 alkyl group), a sulfobetaine group (—RR'N$^+$(CH$_2$)$_n$SO$_3^-$), a carboxyl betaine group (—RR'N$^+$(CH$_2$)$_n$COO_, wherein R and R' are independently a C1 to C20 alkyl group), an azido group (—N$_3$), an amidino group (—C(=NH)NH$_2$), a hydrazino group (—NHNH$_2$), a hydrazono group (=N(NH$_2$), an aldehyde group (—C(=O)H), a carbamoyl group (—C(O)NH$_2$), a thiol group (—SH), an ester group (—C(=O)OR, wherein R is a C1 to C6 alkyl group or a C6 to C12 aryl group), a carboxyl group (—COOH) or a salt thereof (—C(=O)OM, wherein M is an organic or inorganic cation), a sulfonic acid group (—SO$_3$H) or a salt thereof (—SO$_3$M, wherein M is an organic or inorganic cation), a phosphoric acid group (—PO$_3$H$_2$) or a salt thereof (—PO$_3$MH or —PO$_3$M$_2$, wherein M is an organic or inorganic cation), and a combination thereof.

As used herein, the term "hydrocarbon group" refers to a monovalent group containing carbon and hydrogen (e.g., alkyl group, alkenyl group, alkynyl group, or aryl group) formed by a removal of a hydrogen atom from an aliphatic or aromatic hydrocarbon such as alkane, alkene, alkyne, or arene. In the hydrocarbon group, at least one methylene (—CH$_2$—) moiety may be replaced with an oxide (—O—) moiety.

As used herein, the term "alkyl" refers to a linear or branched, saturated monovalent hydrocarbon group (e.g., methyl, hexyl, etc.).

As used herein, the term "alkenyl" refers to a linear or branched monovalent hydrocarbon group having at least one carbon-carbon double bond.

As used herein, the term "aryl" refers to a monovalent group formed by removing one hydrogen atom from at least one aromatic ring (e.g., phenyl or naphthyl).

As used herein, when a definition is not otherwise provided, the term "hetero" refers to inclusion of 1 to 3 heteroatoms that can be N, O, S, Si, P, or a combination thereof.

As used herein, the term "alkylene group" refers to a straight or branched saturated aliphatic hydrocarbon group having a valence of at least two, optionally substituted with one or more substituents. The term "arylene group" refers to a functional group having a valence of at least two obtained by removal of two hydrogens in an aromatic ring, optionally substituted with one or more substituents.

Further as used herein, when a definition is not otherwise provided, an alkyl group is a 01 to C20 alkyl, or a 01 to C12 alkyl, or a 01 to C6 alkyl.

"Combination thereof" refers to a mixture, a stacked structure, a composite, a copolymer, an alloy, a blend, or a reaction product of components.

In addition, in the specification and claims, "*" refers to a point of attachment to nitrogen, carbon, or another atom.

Exemplary embodiments will hereinafter be described in detail, and may be performed by those having ordinary skill in the art. However, this disclosure may be embodied in different forms and is not construed as limited to the example embodiments set forth herein.

In an embodiment, a composite includes a cross-linked polymer including a pyridinium group, and a thermoplastic polymer.

The composite may be a blend of the cross-linked polymer including a pyridinium group, and the thermoplastic polymer. FIG. 1 is a schematic view of the composite. Referring to FIG. 1, in the composite 100, the cross-linked polymer 10 including a pyridinium group is dispersed in the thermoplastic polymer 20. In an embodiment, the cross-linked polymer 10 including a pyridinium group may be an additive that is added to the thermoplastic polymer 20.

The cross-linked polymer 10 including a pyridinium group has desirable antibiotic, antifungal, and antifouling characteristics. The cross-linked polymer 10 may be neither decomposed at about 200° C. nor leached when exposed to water at room temperature or at higher temperatures, over time, and thus provides long-term antibiotic, antifungal, and antifouling functionality.

In the cross-linked polymer 10 including a pyridinium group, the pyridinium group may be, for example, an N-alkylpyridinium group, wherein the alkyl is a linear or branched C1 to C30 alkyl, or C6 to C30 alkyl. The pyridinium group refers to a functional group having a pyridinium cation and may be present in a form of a salt. The pyridinium group may provide desirable antibiotic, antifungal, and antifouling functionality, and, in addition, is not decomposed at a temperature of about 200° C., thus providing desirable processibility and heat resistance. In addition, the cross-linked polymer 10 including a pyridinium group has a cross-linking structure, and thus may not be leached when exposed at room temperature or a higher temperature to water over time while continuously providing antibiotic, antifungal, and antifouling functionality.

The cross-linked polymer 10 including a pyridinium group may be derived from a compound including a pyridinium group and a multi-functional compound including at least two curable functional groups.

For example, the compound including a pyridinium group may be a compound having a pyridinium group and a carbon-carbon double bond (C=C), and may be for example represented by Chemical Formula 1.

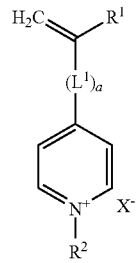

Chemical Formula 1

In Chemical Formula 1, $R^1$ is hydrogen or a methyl group, $L^1$ is a substituted or unsubstituted C1 to C10 alkylene group, a substituted or unsubstituted C3 to C20 cycloalkylene group, a substituted or unsubstituted C6 to C20 arylene group, a substituted or unsubstituted C3 to C20 aliphatic or aromatic heterocyclic group, —C(=O)—, —C(=O)O—, —O—, or —C(=O)NH—, a is a numeral of 0 to 3, $R^2$ is a substituted or unsubstituted C1 to C30 alkyl group, a substituted or unsubstituted C3 to C30 cycloalkyl group, a substituted or unsubstituted C6 to C30 aryl group, or a substituted or unsubstituted C3 to C30 aliphatic or aromatic heterocyclic group, and $X^-$ is a halide ion, a hydroxide ion, a nitrate ion, a phosphate salt ion, a trifluoroacetate salt, or a sulfate ion.

In an example embodiment, the $R^2$ may be a substituted or unsubstituted C6 to C30 alkyl group. When the $R^2$ is an alkyl group having 6 or more carbon atoms, the cross-linked polymer 10 including a pyridinium group derived from the compound represented by Chemical Formula 1 exhibits desirable antibiotic, antifungal, and antifouling properties.

In an embodiment, in Chemical Formula 1, X⁻ is an anion that forms a salt with a pyridinium cation. Non-limiting examples of X⁻ may be F⁻, Cl⁻, Br⁻, I⁻, OH⁻, BF₄⁻, NO₃⁻, H₂PO₄⁻, CF₃COO⁻, HSO₄⁻, and the like.

In an embodiment, the cross-linked polymer 10 including a pyridinium group is derived from the compound represented by Chemical Formula 1, and may be a polymer including a unit represented by Chemical Formula 1-1.

Chemical Formula 1-1

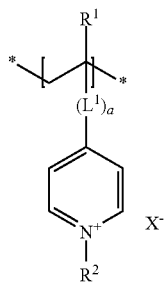

In Chemical Formula 1-1, definitions of $R^1$, $L^1$, a, $R^2$, and X⁻ are the same as in Chemical Formula 1. The unit represented by Chemical Formula 1-1 may show desirable antibiotic, antifungal, and antifouling characteristics.

The pyridinium group may be included in an amount of about 50 mole percent (mol %) to about 99.9 mol % based on the total moles of substituting functional groups in the cross-linked polymer 10 including a pyridinium group, for example, in an amount of about 60 mol % to about 99 mol %, for example, about 70 mol % to about 99 mol %.

The pyridinium group may be included in an amount of about 50 weight percent (wt %) to about 99.9 wt %, for example about 80 wt % to about 99 wt % based on the total weight of the cross-linked polymer 10 including a pyridinium group. When the pyridinium group is included within these ranges, the polymer has a desirable cross-linking degree and exhibits suitable antibiotic, antifungal, and antifouling functionality.

The multi-functional compound including at least two curable functional groups may be a monomer, an oligomer, or a polymer having a curable functional group that may be cross-linked by heat and/or light, and these may be used as a precursor for forming the cross-linked structure of the cross-linked polymer 10 including a pyridinium group. The multi-functional compound may include at least two curable functional groups, for example, a three functional group compound having three curable functional groups, or a four functional group compound having four curable functional groups.

The curable functional group may be, for example, a vinyl group, a (meth)acrylate group, an epoxy group, an oxetane group, a cyanate group, an isocyanate group, a hydroxy group, a carboxyl group, a thiol group, an amino group, an alkoxy group, or a combination thereof, but is not limited thereto.

For example, the multi-functional compound may be a monomer, an oligomer, and/or a polymer including at least two (meth)acrylate groups, and may include, for example, ethylene glycol di(meth)acrylate, propylene glycol di(meth)acrylate, polyethylene glycol di(meth)acrylate, polypropylene glycol di(meth)acrylate, butanediol di(meth)acrylate, hexamethylene glycol di(meth)acrylate, trimethylolpropane tri(meth)acrylate, glycerine tri(meth)acrylate, pentaerythritol tetra(meth)acrylate, diglycerine hexa(meth)acrylate, or a combination thereof, but is not limited thereto.

In an embodiment, the multi-functional compound may be a monomer, an oligomer, and/or a polymer including at least two epoxy groups, and may include, for example, bisphenol A diglycidyl ether, bisphenol F diglycidyl ether, hexahydrophthalic acid glycidyl ester, or a combination thereof, but is not limited thereto.

In an embodiment, the multi-functional compound may be a monomer, an oligomer, and/or a polymer including at least two isocyanate groups, and may include, for example, diphenylmethane diisocyanate, 1,6-hexamethylene diisocyanate, 2,2,4-trimethylhexamethylene diisocyanate, phenylene diisocyanate, 4,4'-dicyclohexylmethane diisocyanate, 3,3'-dimethyldiphenyl-4,4'-diisocyanate, xylene diisocyanate, naphthalene diisocyanate, 1,4-cyclohexyl diisocyanate, or a combination thereof, but is not limited thereto.

A weight average molecular weight (Mw) of the cross-linked polymer 10 including a pyridinium group may be about 1,000 grams per mole (g/mol) to about 10,000,000 g/mol, for example about 10,000 g/mol to about 1,000,000 g/mol. When the weight average molecular weight satisfies the ranges, the cross-linked polymer 10 including a pyridinium group may show sufficient antibiotic, antifungal, and antifouling characteristics and is amenable to a process of being mixed with the thermoplastic polymer and thus forming a composite.

The cross-linked polymer 10 including a pyridinium group may be prepared by copolymerization, for example, the compound including a pyridinium group and the multi-functional compound including at least two curable functional groups. The copolymerization may include mixing the compound including a pyridinium group, the multi-functional compound including at least two curable functional groups, and an initiator along with a solvent or under a solvent member, and subsequent curing.

In the manufacturing method, the multi-functional compound including at least two curable functional groups and the compound including a pyridinium group are included in a mole ratio of about 1:2 to about 1:99.9, for example, about 1:4 to about 1:99.9, for example about 1:6 to about 1:99.9. When the mole ratio satisfies the range, the cross-linked polymer 10 including a pyridinium group may have an appropriate cross-linking degree and show sufficient antibiotic, antifungal, and antifouling characteristics.

The curing may be performed through photocuring, thermal curing, or a combination thereof. The photocuring may be for example performed by UV irradiation at a wavelength of about 150 nanometers (nm) to about 170 nm for about 5 seconds to about 60 seconds. The thermal curing may be for example performed at about 50° C. to about 120° C. for about 1 hour to about 48 hours, for example, about 60° C. to about 100° C. for about 12 hours to about 36 hours.

The initiator may be a photoinitiator, a thermal initiator, or a combination thereof. The photoinitiator may be used for photo-polymerization using ultraviolet radiation. Examples of the photoinitiator include acetophenones such as diethoxyacetophenone, 2-hydroxy-2-methyl-1-phenylpropan-1-one, benzyldimethyl ketal, 1-hydroxycyclohexyl-phenylketone, 2-methyl-2-morphine (4-thiomethylphenyl)propan-1-one, and the like; benzoin ethers such as benzoin methyl ether, benzoin ethyl ether, benzoin isopropyl ether, benzoin isobutyl ether, and the like; benzophenones such as benzophenone, o-benzoylbenzoic acid methyl, 4-phenylbenzophenone, 4-benzoyl-4'-methyldiphenylsulfurous acid, 4-benzoyl-N,N-dimethyl-N-[2-(1-oxo-2-propenyloxy)

ethyl]benzenemethane amine, N—N-dimethyl bromide, (4-benzoylbenzyl)trimethylammonium chloride, and the like; thioxanthones such as 2,4-diethylthioxanthone, 1-chloro-4-dichlorothioxanthone, and the like; 2,4,6-trimethylbenzoyldiphenylbenzoyloxide, and the like. These may be used singularly or as a mixture of two or more.

The thermal initiator may be used for a thermal polymerization. The thermal initiator may be an azo-based initiator such as azobisisobutyronitrile, 2,2'-azobis(2,4-dimethylvaleronitrile), and the like; an organic peroxide free radical initiator such as diacyl peroxides, peroxyketals, ketone peroxides, hydroperoxides, dialkyl peroxides, peroxyesters, peroxydicarbonates, and the like; and, for example, lauroyl peroxide, benzoyl peroxide, cyclohexanone peroxide, 1,1-bis(t-butylperoxy)-3,3,5-trimethylcyclohexane, t-butylhydroperoxide, and the like. These may be used singularly or as a mixture of two or more.

The cross-linked polymer 10 including a pyridinium group may be included in an amount of about 0.1 wt % to about 50 wt %, for example, about 0.1 wt % to about 40 wt %, for example, about 0.1 wt % to about 30 wt %, for example, about 0.1 wt % to about 20 wt %, for example, about 0.1 wt % to about 10 wt %, for example, about 0.5 wt % to about 5 wt % based on the total weight of the composite 100. Even though the cross-linked polymer 10 including a pyridinium group is included within these ranges in the composite 100, the composite 100 or an article including the composite 100 may show a removal rate of greater than or equal to about 99% of *Escherichia coli* (*E. coli*) and *staphylococcus*, have a desirable level of antifungal performance, and provide greater than or equal to about 40% reduction in the degree fouling compared with an article formed of a general thermoplastic polymer but not including the cross-linked polymer including a pyridinium group.

The thermoplastic polymer 20 may be any suitable matrix polymer without a particular limit, and may include, for example, a polyolefin, a polyalkyl(meth)acrylate, a polyacrylonitrile, a polystyrene, a polyvinyl chloride, a polyvinylidene chloride, a silicone polymer, a polysulfone, a polycarbonate, a rubber modified vinyl copolymer, a polyamide, a polyester, a polyurethane, a copolymer thereof, or mixture thereof.

The thermoplastic polymer 20 may be included in an amount of about 50 wt % to about 99.9 wt %, for example, about 60 wt % to about 99.9 wt %, for example, about 70 wt % to about 99.9 wt %, for example, about 80 wt % to about 99.9 wt %, for example, about 90 wt % to about 99.9 wt %, for example, about 95 wt % to about 99 wt % based on the total weight of the composite 100.

The composite 100 includes the thermoplastic polymer 20 and thus may continuously provide desirable antibiotic, antifungal, and antifouling functionality, and be appropriately applicable to a process of extrusion, injection-molding, and the like.

In an example embodiment, the composite 100 may be manufactured by preparing the cross-linked polymer 10 including a pyridinium group, pulverizing the polymer, preparing the thermoplastic polymer 20, and melt-blending the pulverized polymer and the thermoplastic polymer 20 through a twin-screw extruder and the like. During the melt-blending, a temperature may be appropriately adjusted depending on a melting temperature of the thermoplastic polymer 20. The composite 100 may be manufactured into a pellet and the like, for example through extrusion, after the melt-blending.

The composite 100 may be appropriately applied to interior and exterior parts of electronic appliances requiring antibiotic, antifungal, or antifouling functionality and durability, such as a washing tub of a washer, an interior material of a refrigerator, an interior/exterior material of an air conditioner, a dust canister of a vacuum cleaner, and the like. In addition, the composite may be applied to medical appliances such as a hospital bed, a catheter, an artificial tooth, a splint, and the like; 3D-printing products such as a 3D printable antibiotic synthetic resin and the like; mobile products such as a mobile phone and the like; structures, fibers, membranes, or various household items.

Another embodiment provides an article including the composite 100. The composite 100 may be applied to various processes such as extrusion, injection-molding, and the like, and thus manufactured into various articles. These articles are formed of a polymer that itself has antibiotic, antifungal, and antifouling functionality, unlike an antibiotic and antifouling article manufactured in a conventional coating method, and thus reduce the problem of leaching of an antibiotic antifouling component from the article. In turn, this may minimize the harm to a human body, provide functionality that isn't consumed or diminished over time, provide enhance durability, or the like. In addition, the article may maintain excellent antibiotic, antifungal, and antifouling characteristics after greater than or equal to about 10 years in wet conditions.

In an example embodiment, the article may be manufactured by injecting the composite 100 manufactured as a pellet, and the like, into an extruder or an injection-molding unit to mold it. The extrusion and injection-molding are known to those of ordinary skill in the art and may be used to manufacture the article having antibiotic, antifungal, and antifouling functionality.

The article may have antimicrobial functionality to suppress the propagation of bacteria. For example, the removal rate for each of *E. coli* and *staphylococcus* from the article may be greater than or equal to about 90%, for example greater than or equal to about 95%, for example greater than or equal to about 99%, and for example greater than or equal to about 99.9% when measured by an antimicrobial test according to ISO 22196.

The article may maintain desirable antibiotic functionality when exposed to high temperature water over time. The removal rates of *E. coli* and *staphylococcus* of the article after being dipped in 90° C. water for 16 hours according to a test established by the Japanese Society of Industrial technology for Antimicrobial Articles (SIAA) may be greater than or equal to about 90%, for example greater than or equal to about 95%, for example greater than or equal to about 99%, and for example greater than or equal to about 99.9%, and may also be measured according to the antimicrobial test of ISO 22196.

In addition, the article may have a removal rate of both *Escherichia coli* and *staphylococcus* that is greater than or equal to about 90%, for example greater than or equal to about 95%, for example greater than or equal to about 99%, and for example greater than or equal to about 99.9% after the article is twice dipped in 90° C. water for 16 hours according to a test established by the SIAA, and may also be measured according to the antimicrobial test of ISO 22196.

In addition, the article may realize antifouling functionality to prevent the attachment of bacteria. For example, the article may show a reduced degree of fouling that is greater than or equal to about 20%, for example greater than or equal to about 30%, and for example greater than or equal to about 40% when compared with an article having no antifouling treatment, that is, a thermoplastic polymer composition that does not include the cross-linked polymer including pyridinium.

The fouling degree of the article may be for example measured in the following method. The fouling degree of the article is evaluated after the article is repetitively dipped three times for 2 minutes each in a contaminated water standard that is prepared by adding 0.9 wt % of a detergent (Tide, Procter & Gamble), 0.8 wt % of a secondary cut cotton linter (Powder Technologies Inc.), and 0.04 wt % of a dust (JIS Test Powders1-class8, APPIE) to 1 L of distilled water, drying for 15 minutes, and weighing the specimen to calculate the weight of a contaminant attached thereto to obtain a ratio of the weight of the contaminant relative to the weight of the specimen before it is dipped in the contaminated water standard.

In addition, the article shows a desirable degree of antifungal activity. For example, the article may have an antifungal level of 0 when the growth of five different types of fungus on the article is measured after 4 weeks according to an ISO 846 test standard. According to the ISO 846 test standard, the degree of antifungal activity is divided into five levels, from 0 to 5, wherein the lowest degree of fungal growth is at a level of 0.

The article may maintain a desirable degree of antifungal activity when exposed to high temperature water for an extended period of time. For example, the article may have an antifungal level of 0 according to the ISO 846 test standard after being dipped in water at a temperature of about 90° C. for 16 hours according to the SIAA test described above.

Hereinafter, the present disclosure is illustrated in more detail with reference to examples and comparative examples. However, the following examples and comparative examples are provided for the purpose of descriptions and the present disclosure is not limited thereto.

EXAMPLES

Synthesis Example 1: Monomer Synthesis 4-vinylpyridine (10 grams (g), 95.11 millimoles (mmol)) and 1-bromohexane (40 g, 242 mmol) are added to 30 milliliters (mL) of purified tetrahydrofuran (THF) in a 250 mL spherical shape flask, and then stirred at 20° C. under a nitrogen environment for 10 minutes, with stirring continued for 48 hours while refluxed at 70° C. The solution is cooled down and then poured into 100 mL of hexanes, and the obtained mixture is stirred and filtered. A product obtained therefrom is dried in a 50° C. vacuum oven to obtain 25.33 g of 1-hexyl-4-vinylpyridinium bromide (98.5%).

Comparative Example 1: Synthesis of Homopolymer 8.1 g of the 1-hexyl-4-vinylpyridinium bromide according to Synthesis Example 1 is put in a mixed solvent of tetrahydrofuran (2.5 mL) and anhydrous ethanol (22.5 mL), the mixture is stirred at room temperature under a nitrogen atmosphere for 20 minutes, and then 48 mg of azobisisobutyronitrile (AIBN) is added thereto. The obtained mixture is heated at 70° C. and stirred. After 24 hours, the resultant product is precipitated in 500 mL of ethyl acetate, and then filtered and dried at 50° C. under a vacuum condition to obtain 7.65 g of a homopolymer.

Comparative Example 2: Synthesis of Terpolymer 1-hexyl-4-vinylpyridinium bromide of Synthesis Example 1 (2.4 g), sulfobetaine methacrylate (3.6 g), and octadecyl acrylate (6 g) are put in a mixed solvent of 20 mL of tetrahydrofuran and 20 mL of anhydrous ethanol, and then stirred at room temperature under a nitrogen atmosphere for 20 minutes. 64 mg of AIBN is added thereto, and the obtained mixture is heated at 70° C. and stirred. After 24 hours, the resultant product is precipitated in 500 mL of ethanol, and a precipitate therefrom is filtered and dried at 50° C. under a vacuum condition to obtain 10.18 g of a terpolymer.

Example 1: Synthesis of Cross-Linked Polymer

The 1-hexyl-4-vinylpyridinium bromide (8.103 g) synthesized in Synthesis Example is dissolved in 50 mL of ethanol, and trimethylolpropane triacrylate (0.988 g) is dissolved in 5 mL of tetrahydrofuran. These two solutions are mixed. The mixed solution is stirred at room temperature under a nitrogen atmosphere for 20 minutes, and then 56 mg of AIBN is added thereto, and the obtained mixture is heated at 70° C. and stirred. After 24 hours, the solvent is evaporated and reduced in a rotary evaporator, and then the product is precipitated in 500 mL of hexanes, and a precipitate therefrom is filtered and dried at 50° C. under a vacuum condition to obtain 6.86 g of a cross-linked polymer.

The obtained cross-linked polymer is pulverized with mortar and pestle to have a size of less than or equal to 100 mesh (−150 micrometers (μm)). 5 wt % of the pulverized cross-linked polymer and 95 wt % of polypropylene are blended with a twin extruder to manufacture a pellet-type composite. The composite is injection-molded to obtain a specimen with a size of 63 mm×13 mm×2.2 mm (width× length×thickness).

Evaluation Example 1: Surface Analysis of Specimen of Example 1

Figure 2:
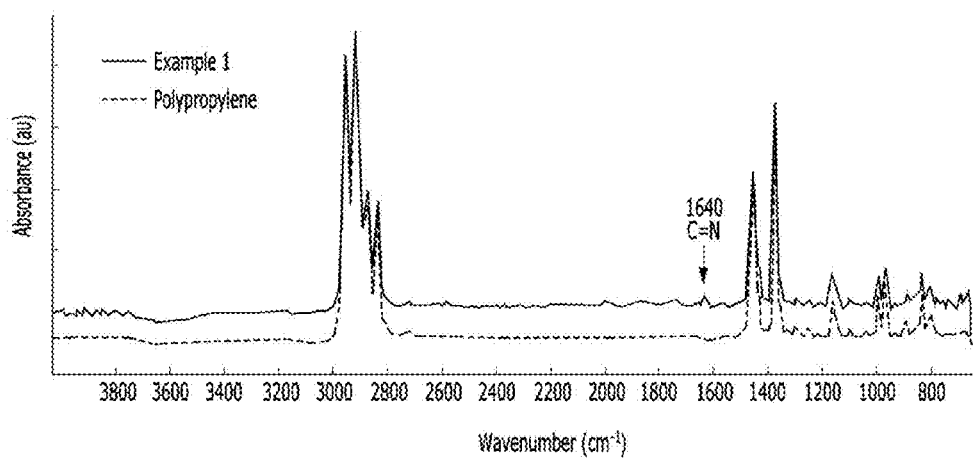
FIG. 2 is a graph of absorbance (arbitrary units, au) versus wavenumber (inverse centimeters, $cm^{-1}$) and shows an infrared spectrum of the specimen according to Example 1.

FIG. 2 shows an infrared (IR) spectrum of the specimen according to Example 1. From a C=N bond peak in FIG. 2, it can be confirmed that the specimen of Example 1 has pyridinium on the surface.

Figure 3:
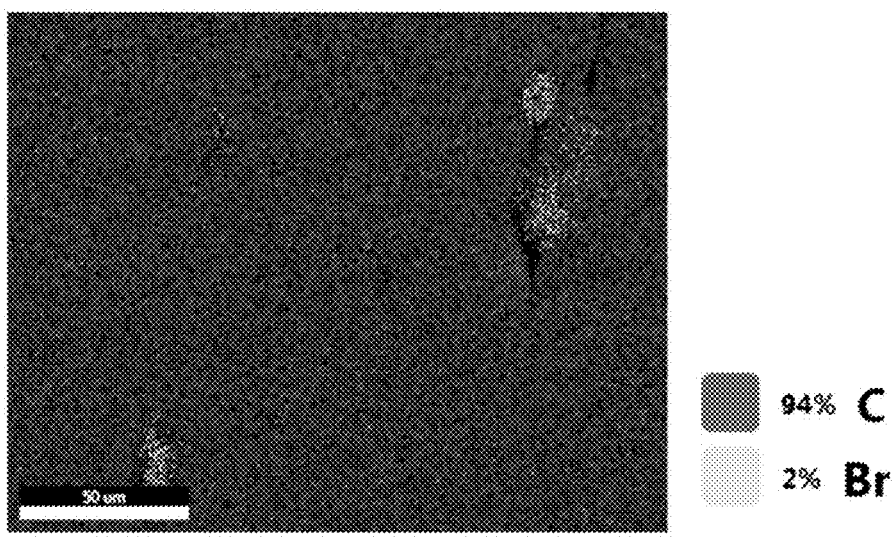
FIG. 3 is an image showing the element mapping of the specimen according to Example 1 by scanning electron microscope-energy-dispersive spectroscopy (SEM-EDAX).

FIG. 3 is an element mapping photograph of the specimen of Example 1 according to scanning electron microscope-energy-dispersive spectroscopy (SEM-EDAX). Referring to FIG. 3, a bromide ion, which is a conjugate base of the pyridinium, is present on the surface of the specimen of Example 1.

Evaluation Example 2: Evaluation of Antimicrobial Test

The removal rates of *E. coli* and *staphylococcus* for the injection molded specimens according to Example 1 and Comparative Examples 1 and 2 are measured, with reference to a specimen obtained by injection-molding polypropylene, according to the ISO 22196 test standard, and the results are shown in Table 1.

In addition, the molded article is dipped in 90° C. water for 16 hours according to a test established by the SIAA, an antimicrobial test is performed according to the ISO 22196 test standard, and the results are shown in Table 1 (SIAA primary test). The article is twice repetitively dipped in 90° C. water for 16 hours, an antimicrobial test is performed according to the ISO 22196 test standard, and the results are shown in Table 1 (SIAA secondary test).

TABLE 1

| | Bacterial removal rate (%) | | | | | |
|---|---|---|---|---|---|---|
| | Initial | | SIAA primary test | | SIAA secondary test | |
| | Staphylo-coccus | E. Coli | Staphylo-coccus | E. Coli | Staphylo-coccus | E. Coli |
| Example 1 | 99.9 | 99.9 | 99.9 | 99.4 | 99.7 | 99.3 |
| Comparative Example 1 | 99.9 | 99.6 | 99.3 | 98.7 | 65.2 | 71.3 |
| Comparative Example 2 | 99.9 | 99.9 | 99.5 | 86.8 | 58.2 | 34.2 |

Referring to Table 1, the specimen according to Example 1 exhibited an initial bacterial removal rate of 99.9%, and a bacterial removal rate of greater than or equal to 99% after being exposed to high temperature water for a long period of time. In contrast, the specimen manufactured by applying a homopolymer including pyridinium according to Comparative Example 1 showed a sharply reduced bacterial removal rate as measured by a SIAA secondary test, and accordingly had a sharply reduced antibiotic functionality when allowed to stand at a high temperature in water for a similar period of time. The specimen manufactured by applying a non-crosslinking copolymer including pyridinium according to Comparative Example 2 exhibited an E. coli removal rate that was reduced to 86.8% when measured according to the SIAA primary test, and had a sharply reduced antibiotic functionality when measured according to the SIAA secondary test. Accordingly, the specimen of Comparative Example 2 showed a sharply reduced antibiotic functionality when allowed to stand in high temperature water for a similar period of time.

Evaluation Example 3: Evaluation of Antifouling Degree 0.9 wt % of a detergent (Tide, Procter & Gamble), 0.8 wt % of Second-cut cotton linters (Powder Technologies Inc.), and 0.04 wt % of Dust (JIS Test Powders1-class8, APPIE) are put in 1 L of distilled water, and the mixture is stirred at 300 rpm to prepare a contaminated water standard.

The specimen of Example 1 and a polypropylene specimen are each repetitively dipped in the contaminated water standard three times for 2 minutes, and then dried for 15 minutes and weighed to calculate an amount of a contaminant attached thereto. The contaminant attached to the specimen of Example 1 weighed 40% less than the contaminant attached to the polypropylene specimen. Accordingly, the specimen of Example 1 exhibited an excellent degree of antifouling.

Evaluation Example 4: Evaluation of Antifungal Degree

The injection molded specimen of Example 1 was evaluated by growing five types of bacteria on the specimen for 4 weeks, and then evaluated according to the ISO 846 measurement standard. In addition, the article is dipped in 90° C. water for 16 hours according to a method established by the SIAA. The injection molded specimen of Example 1 exhibited an antifungal level of 0 for the growth of five types of bacteria for 4 weeks when measured according to both the antifungal degree-measuring method of ISO 846 and a method established by the SIAA. Accordingly, the specimen of Example 1 maintained an excellent degree of antifungal activity when exposed to high temperature water for a long period of time.

While this disclosure has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

What is claimed is:
1. A composite comprising:
   a cross-linked polymer comprising pyridinium group; and
   a thermoplastic polymer.
2. The composite of claim 1, wherein the cross-linked polymer comprising the pyridinium group is derived from a compound comprising the pyridinium group and a multi-functional compound comprising at least two curable functional groups.
3. The composite of claim 2, wherein the compound comprising the pyridinium group is represented by Chemical Formula 1:

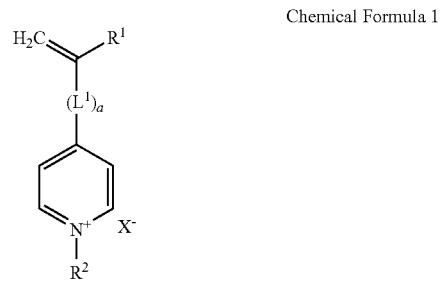

Chemical Formula 1 wherein, in Chemical Formula 1, $R^1$ is a hydrogen atom or a methyl group,
$L^1$ is a substituted or unsubstituted C1 to C10 alkylene group, a substituted or unsubstituted C3 to C20 cycloalkylene group, a substituted or unsubstituted C6 to C20 arylene group, a substituted or unsubstituted C3 to C20 aliphatic or aromatic heterocyclic group, —O(=O)—, —O(=O)O—, —O—, or —C(=O)NH—,
a is an integer of 0 to 3,
$R^2$ is a substituted or unsubstituted C1 to C30 alkyl group, a substituted or unsubstituted C3 to C30 cycloalkyl group, a substituted or unsubstituted C6 to C30 aryl group, or a substituted or unsubstituted C3 to C30 aliphatic or aromatic heterocyclic group, and
$X^-$ is a halide ion, a hydroxide ion, a nitrate ion, a phosphate salt ion, a trifluoroacetate salt, or a sulfate ion.
4. The composite of claim 3, wherein $R^2$ of Chemical Formula 1 is a C6 to C30 alkyl group.
5. The composite of claim 2, wherein the multi-functional compound comprising at least two curable functional groups is selected from ethylene glycol di(meth)acrylate, propylene glycol di(meth)acrylate, polyethylene glycol di(meth)acrylate, polypropylene glycol di(meth)acrylate, butanediol di(meth)acrylate, hexamethylene glycol di(meth)acrylate, trimethylolpropane tri(meth)acrylate, glycerine tri(meth)acrylate, pentaerythritol tetra(meth)acrylate, diglycerine hexa(meth)acrylate, bisphenol A diglycidyl ether, bisphenol F diglycidyl ether, hexahydrophthalic acid glycidyl ester, diphenylmethane diisocyanate, 1,6-hexamethylene diisocyanate, 2,2,4-trimethylhexamethylene diisocyanate, phenylene diisocyanate, 4,4'-dicyclohexylmethane diisocyanate, 3,3'-dimethyldiphenyl-4,4'-diisocyanate, xylene diisocyanate, naphthalene diisocyanate, 1,4-cyclohexyl diisocyanate, and a combination thereof.

6. The composite of claim 1, wherein the pyridinium group is included in an amount of about 50 weight percent to about 99.9 weight percent based on a total weight of the cross-linked polymer comprising the pyridinium group.

7. The composite of claim 1, wherein a weight average molecular weight of the cross-linked polymer comprising the pyridinium group is about 1,000 grams per mole to about 10,000,000 grams per mole.

8. The composite of claim 1, wherein the cross-linked polymer comprising the pyridinium group is included in an amount of about 0.1 weight percent to about 50 weight percent based on a total weight of the composite.

9. The composite of claim 1, wherein the thermoplastic polymer is selected from a polyolefin, a polyalkyl(meth)acrylate, a polyacrylonitrile, a polystyrene, a polyvinyl chloride, a polyvinylidene chloride, a silicone polymer, a polysulfone, a polycarbonate, a rubber modified vinyl copolymer, a polyamide, a polyester, a polyurethane, a copolymer thereof, and a combination thereof.

10. The composite of claim 1, wherein the thermoplastic polymer is included in an amount of about 50 weight percent to about 99.9 weight percent based on a total weight of the composite.

11. An article comprising the composite of claim 1.

12. The article of claim 11, which is manufactured by extruding or injection molding the composite.

13. The article of claim 11, wherein an antibacterial activity of the article is greater than or equal to about 99% against each of *Escherichia coli* and *staphylococcus* when measured according to an ISO 22196 test standard.

14. The article of claim 11, wherein an antibacterial activity of the article is greater than or equal to about 90% against each of *Escherichia coli* and *staphylococcus* when measured according to an ISO 22196 test standard after the article is twice dipped in water at 90° C. for about 16 hours.

15. The article of claim 11, wherein an amount of fouling of the article is reduced by greater than or equal to about 30% compared with an amount of fouling of an article without the cross-linked polymer comprising the pyridinium group of claim 1.

16. The article of claim 11, wherein an antifungal level of the article is 0 when measured according to an ISO 846 test standard.

17. The article of claim 11, wherein an antifungal level of the article is 0 when measured according to ISO 846 after the article is dipped in water at 90° C. for about 16 hours.

18. A method of preparing a composite, the method comprising:
combining
a cross-linked polymer comprising a pyridinium group and
a thermoplastic polymer.

19. The method of claim 18, wherein the cross-linked polymer comprising the pyridinium group is derived from a compound comprising the pyridinium group, and a multi-functional compound comprising at least two curable functional groups.

20. The method of claim 19, wherein the compound comprising the pyridinium group is represented by Chemical Formula 1:

Chemical Formula 1

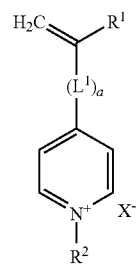

wherein, in Chemical Formula 1, $R^1$ is a hydrogen atom or a methyl group, $L^1$ is a substituted or unsubstituted C1 to C10 alkylene group, a substituted or unsubstituted C3 to C20 cycloalkylene group, a substituted or unsubstituted C6 to C20 arylene group, a substituted or unsubstituted C3 to C20 aliphatic or aromatic heterocyclic group, —C(=O)—, —C(=O)O—, —O—, or —C(=O)NH—, a is an integer of 0 to 3, $R^2$ is a substituted or unsubstituted C1 to C30 alkyl group, a substituted or unsubstituted C3 to C30 cycloalkyl group, a substituted or unsubstituted C6 to C30 aryl group, or a substituted or unsubstituted C3 to C30 aliphatic or aromatic heterocyclic group, and $X^-$ is a halide ion, a hydroxide ion, a nitrate ion, a phosphate salt ion, a trifluoroacetate salt, or a sulfate ion.

* * * * *